Oct. 7, 1969     A. J. CRAIG     3,470,644
MASKING SLIDE MOUNT
Filed Oct. 30, 1967
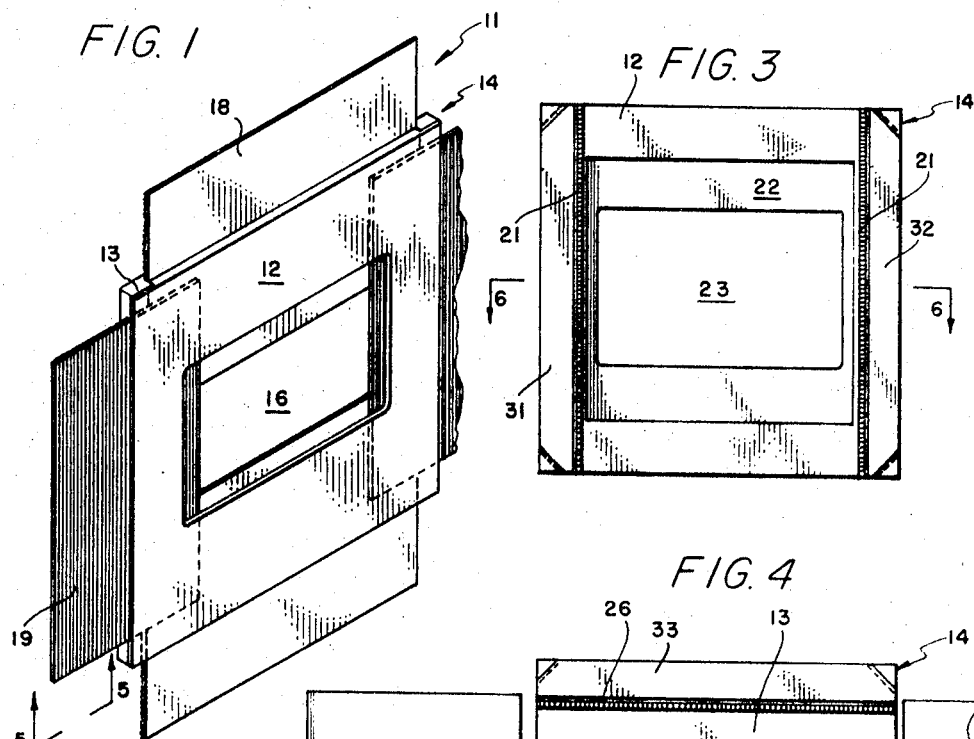
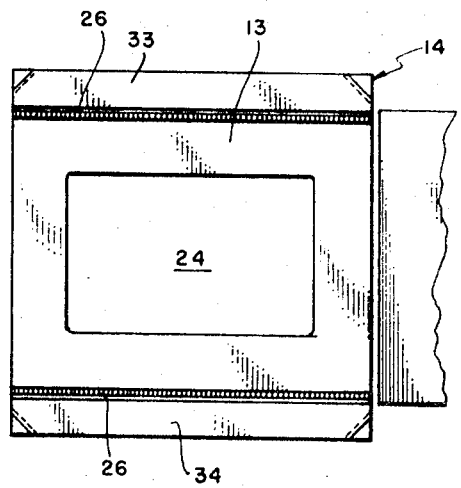
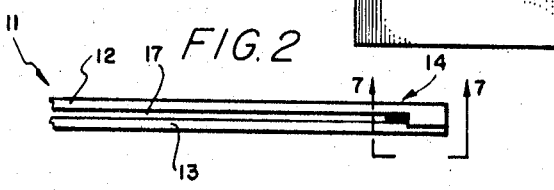
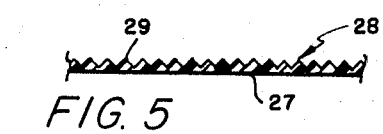
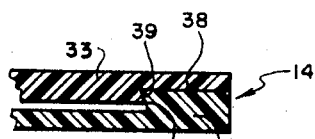
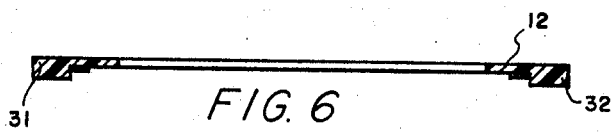
INVENTOR.
ANDREW J. CRAIG
BY
ATTORNEYS 3,470,644
MASKING SLIDE MOUNT
Andrew J. Craig, 1117 S. Paige,
Wichita, Kans. 67207
Filed Oct. 30, 1967, Ser. No. 678,887
Int. Cl. G09f 1/10; G03b 27/58
U.S. Cl. 40—158
9 Claims

ABSTRACT OF THE DISCLOSURE

A masking slide mount is provided having two locking body members which are provided with positioning means mounted on the interior surface of the body members. The positioning means of the two body members are mounted perpendicular to each other and receive masking elements so that the masking elements can be positioned within the two body members to mask out portions of a film frame positioned within the masking slide mount which are not to be seen.

---

This invention relates to mounts. In one aspect the invention relates to a masking mount. In another aspect the invention relates to a masking mount having adjustable masking elements employed to mask out unwanted areas of a film frame. In another aspect it relates to a masking slide mount which can be disassembled to remove the frame therefrom without damage to the frame, and when the masking slide mount is assembled adjustable masking elements can selectively mask off any desired area.

The photographer concerned with aesthetics of composition and picture content of his photographs has relied on selective cropping and enlarging to improve the quality of his prints. To accomplish the same purpose with color transparencies, it would be desirable to have a simple method of masking out unwanted areas of a color frame. In addition, something more durable and rigid than mounting means of the prior art would be desirable in order to maintain a flat film plane. It is also desirable to provide a masking slide mount wherein the photographer can produce from a roll of processed film a set of color slides for projection which are masked to suit his taste.

The slide mounting means of the prior art suffer from the disadvantage in that they are not durable, rigid, and readily disassembled thus preventing constant reuse of the mounting means without damage to the mounting means or the slide positioned therein. Further, the mounting means of the prior art do not provide for adjustable masking means contained therein which do not damage the mount or the film frame positioned within the mount.

According to the present invention a novel masking slide mount is provided which is durable, rigid, and readily disassembled to provide for removal of the film frame or slide positioned therein without damage to the film frame or slide or the slide mount itself.

Further, according to the invention a masking slide mount is provided which does not suffer from the above-mentioned disadvantages of the prior art and which is durable in construction, economical to manufacture, and provides a simple method of masking out unwanted areas of the film frame without damage to the film frame.

Further, according to the invention a masking mount is provided having a first and second body member having an opening therein and the first body member is provided with an enlarged recessed portion surrounding said opening on the interior surface of the first body member for receiving the film frame to be mounted. The first and second body members are maintained together by a lock means, and the lock means are adapted to provide a space between the first and second body members when they are affixed together. A first positioning means is mounted on the inner face of the first body member and a second positioning means is mounted on the inner face of the second body member perpendicular to the first positioning means. A first masking means communicates with the first positioning means and is adapted to be inserted into the space formed between the first and second body members. A second masking means, similar to the first masking means, communicates with said second positioning means and is adapted to be inserted into the space formed between the first and second body members but perpendicular to the first masking means. First and second body members are assembled and constructed so as to receive the first and second masking means so that the first and second masking means can be adjustably moved to mask off a desired area of the frame within the opening of the first and second body members and then securely maintain therein by the first and second positioning means.

Further, according to the invention a masking slide mount is provided wherein the first body member is provided with two rib members mounted in parallel spaced relationship adjacent to parallel edges of the first body member and the second body member is provided with two rib members mounted in parallel spaced relationship adjacent to parallel edges of the second body member, and the rib members of the second body member are positioned perpendicular to the rib members of the first body member when the first and second body members are joined by the lock means. The first and second positioning means are provided with recessed track means on the interior edge portion of the rib members of the first and second body member and extends the length thereof. The masking elements are likewise provided with recessed track means on one side thereof, the recessed track means meshing with the track means of first and second body members thereby allowing the masking means to be adjustably moved and then securely maintained by the recessed track means of the first and second body members.

Further, according to the invention a masking slide mount is provided wherein the lock means is a diagonal step member mounted on the rib member of the first body member adjacent the corner of the first body member and an inverse bevel is provided on said step member at the diagonal portion. A recessed diagonal step member is provided in the corner portion of each of the rib members of the second body member adjacent the corners of the second body member. An inverse bevel is likewise provided on the rib members of the second body member at the diagonal portion. The inverse bevel provided in the rib members of first and second body members cooperate to maintain the two body members together and provide a space therebetween for receiving the masking elements.

An object of the invention is to provide a masking slide mount.

Another object of the invention is to provide a durable, rigid, economical to manufacture masking slide mount.

Another object of the invention is to provide a masking slide mount capable of masking out unwanted areas of a film frame without damage to the frame.

Another object of the invention is to provide a masking slide mount having adjustable masking elements positioned therein to mask out undesired areas of the frame.

Another object of the invention is to provide a masking slide mount which can be readily disassembled for subsequent reuse without damage to the mount or the film frame mounted therein.

Yet another object of the invention is to provide a masking slide mount wherein the film frame can be maintained therein without adhesive or binders.

Another object of the invention is to provide a masking slide mount which is durable in construction, economical to manufacture, and relatively simple in design.

Various other objects, advantages, and features of the invention will be apparent to those skilled in the art from the drawings, the written disclosure, and the amended claims.

Drawings accompany and are part of this disclosure.

The drawings depict preferred specific embodiments of the masking slide mount of the invention, and it is to be understood that these drawings are not to unduly limit the scope of the invention.

In the drawings,

FIG. 1 is a perspective view of the masking slide mount constructed in accordance with the principles of the present invention;

FIG. 2 is an end view of the masking slide mount of FIG. 1 without the masking means;

FIG. 3 is a front plan view of one of the body members of the masking slide mount of the present invention showing positioning means for receiving masking elements;

FIG. 4 is a front plan view of the other body member of the masking slide mount of the present invention showing positioning means for receiving masking elements;

FIG. 5 is an end view of the masking element of FIG. 1 taken along the line 5—5;

FIG. 6 is a cross-sectional view of the body member of FIG. 2 taken along the lines 6—6; and, FIG. 7 is a cross-sectional view of the locking means of the masking slide mount of the present invention taken along the lines 7—7 of FIG. 2.

In the following is a discussion and description of the invention made with reference to the drawings whereupon the same reference numerals are used to indicate the same or similar parts and/or structure. The discussion and description is of preferred specific embodiments of the new masking slide mount of the invention, and it is to be understood that the discussion and description is not to unduly limit the scope of the invention.

Referring now to the drawings, and in particular to FIGS. 1 and 2, masking slide mount 11 is provided with the first body member 12 and a second body member 13 maintained together by lock means 14. First and second body members 12 and 13 are each provided with an opening therein which communicate with each other to form a window opening through which film frame 16 can be seen. Lock means 14, which will be discussed in detail hereinafter, is mounted on first and second body members 12 and 13 to maintain the same together and provide a space 17 therebetween into which first masking means 18 and second masking means 19 can be inserted.

Referring now to FIG. 3, first body member 12 is depicted showing the inner surface of the same. First positioning means 21 is mounted on the inner face of first body member 12 parallel to two parallel edges of first body member 12 and adjacent enlarged recessed portion 22 surrounding opening 23 within first body member 12. One-half of lock means 14 is positioned at each corner of first body member 12, which cooperate with the remaining pair of lock means carried by second body member 13 to maintain first and second body members 12 and 13 together as shown in FIG. 1.

Referring now to FIG. 4 in conjunction with FIG. 3, the interior surface of second body member 13 is shown having opening 24 therein which communicates with opening 23 of first body member 12 to provide a window therethrough as in FIG. 1. Second body member 13 is likewise provided with positioning means 26 mounted on the interior face of second body member 13 so as to be positioned perpendicular to first positioning means 21 of first body member 12 when body members 12 and 13 are assembled. Second masking means 19 is shown adapted to communicate with second positioning means 26 in order to maintain second masking means 19 therein. Second half of lock means 14 is shown positioned at each of the corners of second body member 13 which communicates with the first half of lock means 14 carried by first body member 12 so that when first body member 12 and second body member 13 are positioned together lock means 14 maintains the same together.

Referring now to FIG. 5, first and second masking means 18 and 19 are depicted as a flat plate member 27 provided with recessed track means 28 on one side thereof. Recessed track means 28 mesh with corresponding positioning means 21 and 26 of first and second body members 12 and 13 thereby allowing masking means 18 and 19 to be adjustably moved and then securely maintained therein. Desirable results have been obtained wherein recessed track means 28 are substantially V-shaped tooth elements having an angle therebetween within the range of about 90–120 degrees and wherein one side of plate member 27 is a continuous surface of tooth elements 29 wherein tooth elements 29 extend the length of plate number 27 and have linear apices.

Referring now to FIG. 6 in conjunction with FIGS. 3 and 4, first body member 12 is provided with rib members 31 and 32 mounted in a parallel space relationship adjacent two parallel edges of first body member 12. Second body member 13 is likewise provided with rib members 33 and 34 mounted in a parallel spaced relationship adjacent to parallel edges of second body member 13 but rib members 33 and 34 of second body member 13 are positioned so that when first and second body members 12 and 13 are joined rib members 33 and 34 of second body member 13 are positioned perpendicular to rib members 31 and 32 of first body member 12.

Referring now to FIG. 7 in conjunction with FIGS. 3 and 4, lock means 14 is provided with diagonal step member 36 mounted on the corner portion of the rib members, such as rib member 31 of first body member 12 as shown. An inverse bevel 37 is provided on step member 36 at the diagonal portion. The angle of inverse bevel 37 is within the range of about 3 to 5 degrees. Recessed diagonal step member 38 is mounted on the corner portion of the rib member, such as rib member 33 of second body member 13 as shown. An inverse bevel 39 is likewise provided on rib member 33 of second body member 13 at the diagonal portion. The angle of inverse bevel 39 of recessed step member 38 is within a range of about 3 to 5 degrees so that step member 36 and recessed step member 38 of lock means 14 cooperate to maintain first body member 12 and second body member 13 securely together.

First and second body members 12 and 13 of masking slide mount 11, as well as first and second masking means 18 and 19 can be made of any suitable material such as metal, rigid paper like materials, plastic materials, and the like. Especially desirable results have been obtained wherein the unit is formed by injection molding of the components employing a thermo-plastic resin. First and second body members 12 and 13 are desired to be flexible thereby allowing bending at the corners of masking slide mount 11 in order to separate first and second body members 12 and 13 by withdrawing the inverse bevels 37 and 39 from contact with each other.

By the unique design of masking means 18 and 19 it is readily apparent that once the desired area of film frame 16 has been masked out by mask means 18 and 19 the masking means can readily be cut to remove the extending portions and thereby provide a square or rectangular shaped masking slide mount.

In actual use the masking slide mount of the present invention the first body member, having a rectangular recessed portion around the picture window is positioned and a frame to be mounted is placed into the recess. Selecting two of four of the masking elements, one mask is placed so as to move down from the top and one to move up from the bottom until they leave a gap which includes between the mask edges only that verticle sections desired to be projected. The toothed runners on each side of the mask fits in the recess, toothed tracks of the first body member so that small, precise changes in masking can be done, and so as to guarantee the mask edges will be horizontal. As is readily apparent from the drawings the gap between the masking elements could be above or below the center, symmetric or unsymmetric about the center and of any height.

The second body member is likewise provided with recessed tracks running horizontally. Thus, as with the first body member but now moving horizontally, a second pair of masking elements move in from the left and in from the right so that the second body member with its two masking elements means accomplishes the horizontal masking of the film frame.

When the two body members have their respective masking elements positioned therein they are snapped together at the four corners, this being possible due to the diagonal corner pieces with their inverse bevels. It is made easier by bending the pieces slightly in a direction so as to relieve the bevel. The protruding portions of masking elements are trimmed off by any suitable means, such as a razor blade, along the embossed, indented lines to be flush with the body of masking slide mount.

The resulting mount is cropped for good composition, rigid for good focusing, durable in construction, and relatively inexpensive to manufacture thus providing a new and useful product for mounting various types of slides and the like.

The foregoing discussion and description has been made in connection with preferred specific embodiments of the masking slide mount of the invention. However, it is to be understood that the discussion and description is only intended to illustrate and teach those skilled in the art how to practice the invention and such is not to unduly limit the scope of the invention, which is defined in the claims set forth hereinafter.

I claim:
1. A masking mount comprising:
 (a) a first body member having an opening therein and an enlarged recess portion surrounding said opening for receiving a frame to be mounted;
 (b) a second body member having an opening therein communicating with said opening of said first body member;
 (c) lock means mounted on said first and second body members cooperating to maintain same together, and provide a space therebetween;
 (d) a first positioning means mounted on the inner face of said first body member;
 (e) a second positioning means mounted on the inner face of said second body member perpendicular to said first positioning means; and
 (f) a first masking means communicating with said first positioning means adapted to be inserted into the space formed between said first and second body members; and
 (g) a second masking means communicating with said second positioning means adapted to be inserted into the space formed between said first and second body members; said first and second body means assembled and constructed so as to receive said first and second masking means so that said first and second masking means can be adjustably moved to mask off a desired area of the frame within the opening of said first and second body member and then securely maintained therein by said first and second positioning means.
2. The masking mount according to claim 1 wherein said first body member is provided with two rib members mounted in a parallel spaced relationship adjacent two parallel edges of said first body member and said second body member is provided with two rib members mounted in a parallel spaced relationship adjacent two parallel edges of said second body member, said rib members of said second body member being positioned perpendicular to said rib members of said first body member when said first and second body members are adjoined by said lock means.
3. The masking mount according to claim 2 wherein said lock means comprises:
 (a) diagonal step members mounted on said rib members of said first body member adjacent the corners of said first body members;
 (b) an inverse bevel provided on said step members at the diagonal portion;
 (c) recessed diagonal step members provided in said rib members of said second body member adjacent the corners of said second body member; and
 (d) an inverse bevel provided on said rib members of said second body member at the diagonal portion, said diagonal step members recessed diagonal step members and their inverse bevels cooperating to maintain said first and second body members together.
4. The masking mount according to claim 3 wherein the angle of said inverse bevel of said step members and said rib members of said second body members are in the range of about 3–5 degrees.
5. The masking mount according to claim 1 wherein said first and second positioning means comprises recessed track means provided on the interior edge portion of said rib members of said first and second body members and extending the length thereof.
6. The masking mount means according to claim 5 wherein said track means are provided with substantially V-shaped tooth elements having an angle therebetween within the range of about 90–120 degrees.
7. The masking mount according to claim 5 wherein said first and second masking means are flat plate members provided with recessed track means on one side thereof, said recessed track means meshing with said track means of said first and second body members thereby allowing said masking means to be adjustably moved and then securely maintained by said recessed track means of said first and second body members.
8. The masking mount according to claim 7 wherein said recessed track means of said masking means are provided with substantially V-shaped tooth elements having an angle therebetween within the range of about 90–120 degrees.
9. The masking mount according to claim 8, one side of said flat plate member is a continuous surface of tooth elements wherein said tooth element extends the length of said flat plate member and have linear apices.

References Cited

UNITED STATES PATENTS 2,589,094  3/1952  Konopka _____ 355—74
2,654,289  10/1953  Flynn _____ 355—74 X
3,023,525  3/1962  Cointreau _____ 40—155

EUGENE R. CAPOZIO, Primary Examiner

WENCESLAO J. CONTRERAS, Assistant Examiner

U.S. Cl. X.R.

355—74